United States Patent [19]

Segawa et al.

[11] 4,330,470

[45] May 18, 1982

[54] PROCESS FOR PRODUCING HIGHLY CHLORINATED COPPER PHTHALOCYANINE

[75] Inventors: Tomio Segawa; Sakae Kuramoto, both of Yokohama, Japan

[73] Assignee: Kawasaki Kasei Chemicals Ltd., Tokyo, Japan

[21] Appl. No.: 217,744

[22] Filed: Dec. 18, 1980

[30] Foreign Application Priority Data

Jan. 31, 1980 [JP] Japan ................ 55/104474

[51] Int. Cl.³ ............................................. C09B 47/10
[52] U.S. Cl. ........................... 260/245.84; 260/245.83
[58] Field of Search ......................................... 260/314.5

[56] References Cited

U.S. PATENT DOCUMENTS

| | | | |
|---|---|---|---|
| 2,662,085 | 12/1953 | Holtzman et al. | 260/314.5 |
| 4,091,028 | 5/1978 | Barraclough et al. | 260/314.5 |
| 4,218,376 | 8/1980 | Matsuura et al. | 260/314.5 |

FOREIGN PATENT DOCUMENTS

| | | |
|---|---|---|
| 474740 | 11/1937 | United Kingdom . |
| 499415 | 1/1939 | United Kingdom . |
| 821629 | 10/1959 | United Kingdom . |
| 925379 | 5/1963 | United Kingdom . |
| 926978 | 5/1963 | United Kingdom . |
| 949714 | 2/1964 | United Kingdom . |
| 1198874 | 7/1970 | United Kingdom . |
| 1466234 | 3/1977 | United Kingdom . |
| 1578931 | 11/1980 | United Kingdom . |

*Primary Examiner*—Richard Raymond
*Attorney, Agent, or Firm*—Oblon, Fisher, Spivak, McClelland & Maier

[57] ABSTRACT

A highly chlorinated copper phthalocyanine is produced by chlorinating a copper phthalocyanine in the presence of a catalyst for chlorination in a solvent by charging chlorine under an elevated pressure. The chlorination is carried out in an inert organic solvent incorporating chlorosulfonic acid and/or pyrosulfuryl chloride at a ratio of 1 to 30 wt. % based on said inert organic solvent which maintain dispersibility of said resulting highly chlorinated copper phthalocyanine.

6 Claims, No Drawings

PROCESS FOR PRODUCING HIGHLY CHLORINATED COPPER PHTHALOCYANINE

BACKGROUND OF THE INVENTION

1. Field of the Invention

The present invention relates to a process for producing a highly chlorinated copper phthalocyanine by a chlorination of a copper phthalocyanine, particularly, it relates to an industrial advantageous process for producing a highly chlorinated copper phthalocyanine by a chlorination of a copper phthalocyanine.

2. Description of the Prior Art

A copper phthalocyanine is a blue pigment. A green pigment is obtained by chlorinating a copper phthalocyanine to substitute 12 or more of hydrogen atoms of benzene rings with chlorine atoms preferably to substitute with 13 or more of chlorine atoms among 16 of sites. A brilliant yellowish green pigment is obtained by substituting with 14 or more of chlorine atoms.

The highly chlorinated copper phthalocyanine pigment is called as copper phthalocyanine green or phthalocyanine green and it is a pigment having excellent light fastness and solvent resistance.

In the well-known industrial process for producing a highly chlorinated copper phthalocyanine by a chlorination of a copper phthalocyanine, a copper phthalocyanine is dissolved in a molten mixture of anhydrous aluminum chloride and sodium chloride and it is contacted with chlorine gas at 160° to 200° C. to chlorinate the copper phthalocyanine and the reaction mixture is poured into a large amount of ice water and the chlorinated copper phthalocyanine is separated.

This process is widely carried out as an industrial process since a brilliant yellowish green pigment can be easily obtained. However, the following disadvantages are found.

(1) A cost for a recovery of aluminum chloride and sodium chloride is too high to carry out as an industrial purpose and a cost for treating aluminum chloride in a waste water is remarkably high because 5 to 8 times by weight of anhydrous aluminum chloride to a copper phthalocyanine is used and the reaction mixture is poured in water.

(2) A chlorination is carried out at high temperature of 160° to 200° C. whereby various by-products are formed to decrease a yield.

On the other hand, it has been known to produce a highly chlorinated copper phthalocyanine by dissolving a copper phthalocyanine in chlorosulfonic acid and charging chlorine into the solution in the presence of a catalyst in U.S. Pat. No. 2,662,085.

This process has advantages.

(1) A reaction temperature is upto 115° C. and an operation is easier and a corrosion of an apparatus is lower in comparison with those of the aluminum chloride-sodium chloride process.

(2) A cost of chlorosulfonic acid is lower than that of anhydrous aluminum chloride.

However, this process has not been carried out as an industrial process because of the following reason.

(1) An yield is remarkably lower than that of the aluminum chloride-sodium chloride process.

(2) A hue of the resulting pigment is not good and bluish and a brilliant yellowish green has not been given.

It has been also known to produce a highly chlorinated copper phthalocyanine by chlorinating a copper phthalocyanine in a solvent of pyrosulfuryl chloride with thionyl chloride in Japanese Pat. No. 15790/1962.

This process is not an industrial process because a large amount of thionyl chloride is used.

The inventors have studied to provide a process for producing a highly chlorinated copper phthalocyanine which is to overcome the disadvantages in the conventional processes. In Japanese Patent Application No. 148081/1977 (Japanese Unexamined Patent Publication No. 81334/1979), it has been proposed to provide a process for producing a highly chlorinated copper phthalocyanine having brilliant yellowish green in high yield and industrial advantages in a solvent of chlorosulfonic acid or pyrosulfuryl chloride under reducing disadvantages caused in the conventional processes using such solvent. However, in the former process, a large amount of inorganic strong acidic compounds such as sulfur oxyacid chlorides have been used as a solvent whereby various industrial disadvantages such as corrosion of the apparatus are caused in the separation and recovery of a residue containing the object product by distilling and recovering the solvent components from the reaction mixture.

On the other hand, it has been also known to chlorinate a copper phthalocyanine by feeding chlorine gas at a temperature higher than 150° C. in the presence of a suitable catalyst such as aluminum chloride, zinc chloride, cupric chloride, antimony trisulfide, iodine and sulfur chloride in an organic solvent which is inert to chlorine such as carbon tetrachloride, trichloroacetic acid, nitrobenzene, trichlorobenzene, tetrachloroethane, chloroindane and phthalochloride as the solvent for reaction. In any cases, the chlorination is not enough at a reaction temperature of lower than 150° C., and yellowish green product could not be obtained but only bluish green product is obtained. For example, at a reaction temperature of 120° C., only 12 of hydrogen atoms among 16 of hydrogen atoms on the benzene rings of the copper phthalocyanine are substituted by chlorine atoms.

SUMMARY OF THE INVENTION

It is an object of the present invention to overcome the disadvantages of the conventional chlorination of a copper phthalocyanine.

It is an object of the present invention to provide a process for producing a highly chlorinated copper phthalocyanine having brilliant yellowish green in high yield and industrial advantages in a chlorination of a copper phthalocyanine in a specific solvent in economical manner under reducing corrosion of an apparatus and reducing adhesion of a residue.

The foregoing and other objects of the present invention have been attained by providing a process for producing a highly chlorinated copper phthalocyanine by chlorinating a copper phthalocyanine by charging chlorine under an elevated pressure in the presence of a catalyst for chlorination in an inert organic solvent incorporating chlorosulfonic acid and/or pyrosulfuryl chloride at a ratio of 1 to 30 wt. % based on said inert organic solvent which maintain dispersibility of said resulting highly chlorinated copper phthalocyanine.

DETAILED DESCRIPTION OF THE PREFERRED EMBODIMENTS

The present invention has been attained by the finding the fact that 13 or more of hydrogen atoms among 16 of hydrogen atoms on the benzene rings of the copper phthalocyanine can be stoichiometrically substituted by chlorine atoms by charging chlorine gas at a relatively low temperature of 150° C. or lower and an elevated pressure of 1 to 20 kg/cm$^2$ (gauge) into a suspension of the copper phthalocyanine in the presence of a catalyst for chlorination (sulfur chloride and iodine) in an inert organic solvent such as dichloroethane, trichloroethane, tetrachloroethane, trichlorobenzene and nitrobenzene by incorporating pyrosulfuryl chloride and/or chlorosulfonic acid as its precursor at a ratio of about 3 wt. % based on said inert organic solvent.

In the process of the present invention, the amount of chlorosulfonic acid and/or pyrosulfuryl chloride incorporated into the inert organic solvent should be in a range of 1 to 30 wt. % preferably 2 to 20 wt. % based on said inert organic solvent. The reason is as follows. When the ratio is less than 1 wt. %, the number of chlorine atoms substituted on the benzene rings of the copper phthalocyanine is less than 13 to cause bluish non-brilliant color whereas when the ratio is more than 30 wt. %, a size of crystals of the resulting crude highly chlorinated copper phthalocyanine is too large as a diameter of 2 to 5μ and a length of 10 to 20μ, whereby the hue of the crude pigment is non-brilliant. Moreover, the residue is adhered on the inner wall of the distillator to be difficulty peeled off in the recovery of the solvent from the chlorination reaction mixture by a reduced pressure distillation, whereby the industrial operation is remarkably disadvantageous.

In the former process for highly chlorination of a copper phthalocyanine by using chlorosulfonic acid and pyrosulfuryl chloride as the main solvent for reaction, chlorosulfonic acid and pyrosulfuryl chloride as the main solvent are partially converted into polypyrosulfuryl chloride ($S_3O_8Cl_2$ and $S_4O_{11}Cl_2$) which are high boiling point products. In order to recover more than 70% of the solvent including the high boiling point products, it is necessary to raise a temperature of a heating jacket to higher than 150° C. and to increase a vacuum degree to higher than 50 torr. Moreover, even though the temperature of the heating jacket and the vacuum degree are further increased, the recovery ratio of the solvent is not substantially increased. The maximum of the recovery ratio may be 75%. The reaction mixture obtained in such condition of the reduced pressure distillation of the solvent, imparts high corrosive property to metals. The metals having high corrosion resistance such as stainless steels which are commonly used, are also highly corroded and even high grade corrosion resistant metals such as Hastelloy can not be completely corrosion resistant.

In accordance with the present invention, the inert organic solvent which is inert to chlorine, is used as the main solvent and only small amount of chlorosulfonic acid and/or pyrosulfuryl chloride at a ratio of 1 to 30 wt. % is incorporated whereby the solvents for reaction can be easily recovered after the chlorination, at a ratio of 95% or more by the reduced pressure distillation from the reaction mixture. The recovered solvents can be reused as the solvent for the next chlorination. Moreover, the crude highly chlorinated copper phthalocyanine obtained by washing the residue containing the highly chlorinated copper phthalocyanine with an acid and with a base, after separating and recovering the solvents by the reduced pressure distillation, has the same brilliant property and tinting strength as those of the pigment obtained by the conventional pigmentation process from the crude highly chlorinated copper phthalocyanine obtained by the conventional process (the aluminum chloride-sodium chloride process), which has non-brilliant and less tinting strength because of rough and hard particles and which should be pigmentized by an acid pasting method, an acid slurry method or a salt grinding method.

Moreover, the resulting crude highly chlorinated copper phthalocyanine has the following advantages in comparison with the product obtained without the incorporation of chlorosulfonic acid and/or pyrosulfuryl chloride in said organic solvent.

(1) The crude crystals (particles) are soft and the hue is yellowish green and brilliant.

(2) The brilliant property and tinting strength are superior to others when the product is pigmentized by the salt grinding method or the acid slurry method.

Moreover, the residue containing the highly chlorinated copper phthalocyanine obtained by separating and recovering the solvent including mainly the inert organic solvent from the reaction mixture by the reduced pressure distillation, can be obtained in the powdery form without adhering on the inner wall of the distillator and can be easily discharged from the distiller to be remarkably advantageous in an industrial operation, in comparison with the fact that the residue containing highly chlorinated copper phthalocyanine obtained by using chlorosulfonic acid and/or pyrosulfuryl chloride as the main solvent for chlorination, is adhered on the inner wall of the distiller and is not easily peeled off from the inner wall.

Moreover, the corrosive property to metals is remarkably less than that of the process using chlorosulfonic acid and/or pyrosulfuryl chloride as the main solvent, because the concentration of chlorosulfonic acid and/or pyrosulfuryl chloride in the process of the present invention is remarkably low as lower than 30 wt. %.

In the process using chlorosulfonic acid and/or pyrosulfuryl chloride as the main solvent, a stainless steel can not be used for a substrate of the distiller equipped with a stirrer which is used for recovering the solvent from the reaction mixture by the reduced pressure distillation, because of high corrosive property. On the contrary, in the process of the present invention, the normal stainless steel can be used for the substrate, to be remarkably advantageous for the industrial purpose.

The organic solvents which are inert to chlorination and used as the main solvent in the chlorination of the present invention, preferably have the following properties.

(1) The organic solvents are non-reactive to pyrosulfuryl chloride and the catalyst for chlorination such as sulfur chloride and iodine added to the organic solvent at lower than 150° C. in the presence of chlorine.

(2) The organic solvents preferably have a boiling point of lower than 220° C.

Suitable organic solvents include aliphatic saturated halogenated hydrocarbons such as carbon tetrachloride, 1,2-dichloroethane, 1,1,2-trichloroethane, 1,1,1,2-tetrachloroethane, 1,1,2,2-tetrachloroethane, pentachloroethane, 1,2-dichloropropane, 1,2,3-trichloropropane, 1-chloropentane, bromofuran, 1,2-dibromoethane, 1,1,2,2-tetrabromoethane, 1-bromo-2-chloroethane and 1,1,2,2-tetrachloro-1,2-difluoroethane; and aromatic halogenated or nitrated hydrocarbons such as chlorobenzene, o-dichlorobenzene, m-dichlorobenzene, 1,2,4-trichlorobenzene, o-chlorotoluene, p-chlorotoluene, bromobenzene, o-dibromobenzene, benzotrifluoride; hexafluorobenzene and nitrobenzene.

It is also possible to use solvents which are converted into said chlorinated solvents under the condition of the chlorination, for example, unsaturated hydrocarbons and halohydrocarbons such as 1,2-dichloroethylene, and aromatic hydrocarbons such as benzene and toluene.

The amount of the inert organic solvent can be in a range required for dissolving or suspending the copper phthalocyanine as the starting material so as to be satisfactorily in contact with chlorine gas in principle, and it is usually about 3 to 20 times by weight of the copper phthalocyanine as the starting material and preferably about 4 to 10 times in the industrial process.

In the chlorination of the present invention, sulfur chloride and/or sulfur as the catalyst for chlorination (hereinafter referring to as A catalyst) are incorporated at a ratio of more than 0.1 wt. % preferably 0.1 to 30 wt. % based on the inert organic solvent with or without iodine and/or iodine chloride as the other catalyst for chlorination (hereinafter referring to as B catalyst).

When A catalyst and B catalyst are not incorporated, the reaction temperature should be higher, and otherwise the resulting highly chlorinated copper phthalocyanine is a bluish pigment though the yield is substantially stoichiometric and the hue is brilliant. The increase of the reaction temperature is disadvantageous because the yield is slightly decreased by a side reaction even at a relatively low reaction temperature as 120° C. or higher. On the other hand, when only A catalyst is used, the resulting highly chlorinated copper phthalocyanine is a bluish pigment though the yield of the resulting highly chlorinated copper phthalocyanine is stoichiometric at a relatively high reaction temperature as about 150° C. and the hue is brilliant. On the other hand, when only B catalyst is used, the yield is decreased even at a low reaction temperature as about 100° C. though the resulting highly chlorinated copper phthalocyanine has brilliant hue. Therefore, it is preferable to incorporate both of A catalyst and B catalyst together with chlorosulfonic acid and/or pyrosulfuryl chloride into the organic solvent. In usual, B catalyst is incorporated at a ratio of higher than 0.05 wt. % preferably 0.05 to 10 wt. % based on the organic solvent together with A catalyst whereby the highly chlorinated copper phthalocyanine having brilliant yellowish green can be obtained in high yield at a reaction temperature of lower than 150° C.

Suitable B catalysts used with A catalyst, include iodine, iodine chlorides such as iodine monochloride and iodine trichloride and metal chlorides such as anhydrous aluminum chloride, anhydrous ferric chloride, antimony trichloride and cupric chloride.

In the process of the present invention, the elevated pressure is important factor for producing a brilliant yellowish green pigment in high yield.

The pressure is usually in a range of 1 to 20 Kg/cm$^2$ (gauge) preferably 2 to 8 Kg/cm$^2$ (gauge) especially 3 to 7 Kg/cm$^2$ (gauge).

In the case of 1 to 2 Kg/cm$^2$ (gauge), a brilliant pigment of the crude highly chlorinated copper phthalocyanine can be obtained in a yield of more than 95% (as theoretical value) but the color is bluish green.

In the case of higher than 2 Kg/cm$^2$ (gauge) especially higher than 3 Kg/cm$^2$ (gauge), a brilliant yellowish green pigment of the crude highly chlorinated copper phthalocyanine can be obtained in high yield.

Chlorine can be charged in a form of liquid or gas and preferably in a form of gas.

It is not advantageous as an industrial operation, to perform the chlorination under a pressure of higher than 20 Kg/cm$^2$ (gauge). In general, it is preferable to be lower than 10 Kg/cm$^2$ (gauge) especially lower than 8 Kg/cm$^2$ (gauge) whereby a liquefaction of chlorine gas is not caused at room temperature. It is optimum to be lower than 7 Kg/cm$^2$ (gauge).

In general, a reaction time can be shortened and an amount of chlorine can be reduced and a loss of the solvent in the reaction can be reduced advantageously depending upon elevating the reaction pressure.

In the process of the present invention, the reaction temperature is usually lower at the initial stage such as to elevate from room temperature to 100° C. to 150° C. during the reaction.

It is advantageous to elevate the pressure to higher level at the maximum reaction temperature. When the reaction temperature is higher than 150° C., a color of the pigment is a brilliant yellowish green however, a yield is remarkably low. In general, the maximum temperature is 120° C. to 150° C.

In one embodiment of the chlorination of the present invention, 1,1,2,2-tetrachloroethane is used as the inert organic solvent, and chlorosulfonic acid and/or pyrosulfuryl chloride and a catalyst for chlorination as A catalyst such as sulfur chloride and/or sulfur and B catalyst as iodine and the copper phthalocyanine at desired ratios are added and chlorine gas is charged to contact with it under a desired elevated pressure in the condition raising a temperature from the room temperature to 120° to 150° C. and maintaining the temperature for 1 to 4 hours to complete the reaction. The solvent is recovered from the reaction mixture by the distillation. The residue is not adhered on the inner wall of the distiller and is easily discharged in a powdery form. The discharged residue is washed with an acid and with a base and dried by the conventional processes to obtain the crude highly chlorinated copper phthalocyanine having brilliant yellowish green color in high yield.

In accordance with the process of the present invention, most of the solvent can be easily recovered by the distillation such as the atmospheric pressure or reduced pressure distillation, from the reaction mixture obtained by the chlorination.

The solvent recovered by the distillation contains chlorosulfonic acid and/or pyrosulfuryl chloride and A catalyst (B catalyst in some case), and accordingly, it is possible to repeat the chlorination by adding the copper phthalocyanine at a desired ratio to the distillate without adding chlorosulfonic acid and/or pyrosulfuryl chloride, A catalyst and B catalyst and charging chlorine gas under the condition of the pressure and the temperature, and further it is possible to repeat the chlorination by using the distillate obtained from the reaction mixture and adding the copper phthalocyanine whereby the highly chlorinated copper phthalocyanine having excellent property can be obtained in high yield. It is also preferable that the distillate is admixed with the solvents and the catalyst which correspond to the losses in the reaction and the recovery of the solvent, so as to reuse the distillate as the solvents in the process of the present invention.

The present invention will be further illustrated by certain examples which are provided for purposes of illustration only and are not intended to be limiting the present invention. In the examples, the terms "part" and "%" mean "part by weight" and "% by weight".

EXAMPLE 1

In a reactor, 150 parts of 1,1,2,2-tetrachloroethane, 4.5 parts of chlorosulfonic acid, 1.0 part of sulfur monochloride and 0.3 part of iodine were charged and 17 parts of crude copper phthalocyanine (purity of 93%) was added and suspended in the solution with stirring. Into the suspension, chlorine gas was fed during 7 hours under gradually elevating a temperature from room temperature to 140° C. During the reaction, the control valve of the reactor at the outlet was controlled depending upon the feeding of chlorine gas so as to maintain the pressure of the reactor at 5.0 kg./cm² gauge. After the chlorination, 142 parts of the solvent was recovered from the reaction mixture by a reduced pressure by a rotary evaporator. The residue containing highly chlorinated copper phthalocyanine was not adhered on the inner wall of the evaporator to be easily discharged. Into the discharged residue, 300 parts of 2% aqueous solution of sulfuric acid was added and stirred at 90° C. for 1 hour and the mixture was filtered and the filtered cake was charged into 300 parts of 2% aqueous solution of sodium hydroxide. The mixture was stirred at 90° C. for 1 hour and filtered and dried to obtain 30.7 parts of yellowish green crude highly chlorinated copper phthalocyanine.

The resulting crystals were acicular crystals having substantially uniform grain size {mainly $(0.2–0.3\mu\phi) \times (2–3\mu)$}.

The product had 14.8 of substituted chlorine atoms, as an average, in the copper phthalocyanine molecule and had a purity of 97% and an yield was 100% (as theoretical value).

The product was compared with a pigment obtained by pigmentation by the conventional salt grinding process, from the crude highly chlorinated copper phthalocyanine obtained by the conventional aluminum chloride-sodium chloride process. The tinting strength and the brightness were substantially the same.

REFERENCE 1

In accordance with the process of Example 1 except that the pressure in the reactor was varied to the atmospheric pressure, the process was carried out to obtain 27.6 parts of bluish green crude highly chlorinated copper phthalocyanine.

The product had 12.5 of substituted chlorine atoms, as an average, in the copper phthalocyanine molecule and had a purity of 97% and an yield was 97% (as theoretical value).

REFERENCE 2

In accordance with the process of Example 1 except that chlorosulfonic acid was not added, the process of Example 1 was carried out to obtain 26.4 parts of dark bluish green black crude highly chlorinated copper phthalocyanine.

The product had 11.5 of substituted chlorine atoms, as an average, in the copper phthalocyanine molecule and had a purity of 97% and an yield was 96% (as theoretical value).

EXAMPLE 2

In accordance with the process of Example 1 except that iodine was not added and the final reaction temperature was 150° C., the process was carried out to obtain 28.9 parts of bluish green crude highly chlorinated copper phthalocyanine.

The product had 13.5 of substituted chlorine atoms, as an average, in the copper phthalocyanine molecule and had a purity of 97% and an yield was 98% (as theoretical value).

The product was compared with a pigment obtained by pigmentation by the conventional salt grinding process, from the crude highly chlorinated copper phthalocyanine obtained by the conventional aluminum chloride-sodium chloride process. The tinting strength and the brightness were substantially the same.

REFERENCE 3

In accordance with the process of Example 1 except that sulfur monochloride was not added, the process was carried out to obtain 27.4 parts of bluish green crude highly chlorinated copper phthalocyanine.

The product had 12.0 of substituted chlorine atoms, as an average, in the copper phthalocyanine molecule and had a purity of 97% and an yield was 98% (as theoretical value).

REFERENCE 4

In accordance with the process of Example 1 except that chlorosulfonic acid was used instead of 1,1,2,2-tetrachloroethane, and 49 parts of sulfur monochloride was used, the process was carried out and the resulting reaction mixture was treated by the rotary evaporator in a reduced pressure distillation to separate and recover the solvent. The residue was adhered on the inner wall of the evaporator and was not easily peeled off.

REFERENCE 5

In accordance with the process of Example 1 except that 52.5 parts (35% to tetrachloroethane) of chlorosulfonic acid was used, the process was carried out to obtain 29.8 parts of dull yellowish green crude highly chlorinated copper phthalocyanine. The product had 14.5 of substituted chlorine atoms, as an average, in the copper phthalocyanine molecule and had a purity of 97% and an yield was 98% (as theoretical value).

The resulting crystals of the crude highly chlorinated copper phthalocyanine had ununiform large grain size {mainly $(2–3\mu\phi) \times (20–50\mu)$}. The residue was adhered on the inner wall of the evaporator and was not easily peeled off.

EXAMPLE 3

In accordance with the process of Example 1 except that pyrosulfuryl chloride was used instead of chlorosulfonic acid, the process was carried out. The result was the same as Example 1.

EXAMPLE 4

In accordance with the process of Example 1 except using carbon tetrachloride, 1,2-dichloroethane, 1,1,2-trichloroethane, 1,1,1,2-tetrachloroethane, pentachloroethane, 1,2-dichloropropane, 1,2,3-trichloropropane, 1-chloropentane, 1,2-dibromoethane, 1,1,2,2-tetrabromoethane, 1-bromo-2-chloroethane, 1,1,2,2-tetrachloro-1,2-difluoroethane, chlorobenzene, o-dichlorobenzene, m-dichlorobenzene, 1,2,4-trichlorobenzene, o-chlorotoluene, p-chlorotoluene, bromobenzene, o-dibromobenzene, benzotrifluoride, hexafluorobenzene, nitrobenzene, 1,2-dichloroethylene or benzene instead of 1,1,2,2-tetrachloroethane as an inert solvent and varying the reaction pressure in a range of 5 to 7 kg./cm²G depending upon the kind of the solvent, each chlorination was carried out. The results are substantially the same as that of Example 1.

EXAMPLE 5

In accordance with the process of Example 1 except that 45 parts (30% to the solvent) of sulfur monochloride was used, the process was carried out. The result was the same as Example 1.

EXAMPLE 6

In accordance with the process of Example 1 except using 155 parts of the solvent recovered by the reduced pressure distillation from the reaction mixture obtained by the chlorination of Example 1, and admixing 17 parts of crude copper phthalocyanine (purity of 93%) without adding the other component, the chlorination was carried out by feeding chlorine gas. The chlorinated reaction mixture was treated by the reduced pressure distillation of Example 1 to separate and recover the solvent. The residue discharged easily from the evaporator was washed with an acid and filtered and washed with an alkaline solution and filtered and dried to obtain 30.4 parts of bright yellowish green crude highly chlorinated copper phthalocyanine.

The product had 14.8 of substituted chlorine atoms, as an average, in the copper phthalocyanine molecule and had a purity of 97% and an yield was 99% (as theoretical value).

The product was compared with a pigment obtained by pigmentation by the conventional salt grinding process, from the crude highly chlorinated copper phthalocyanine obtained by the conventional aluminum chloride-sodium chloride process. The tinting strength and the brightness were substantially the same.

The recovered solvent was also used and the crude copper phthalocyanine was added at the same ratio and the chlorination was carried out by the same process. The solvent was separated and recovered by the reduced pressure distillation.

The residue containing the resulting crude highly chlorinated copper phthalocyanine discharged from the evaporator was post-treated. The result was the same as that of the above-mentioned process.

In accordance with the process of Example 1 except that tetrachloroethane, chlorosulfonic acid, sulfur monochloride and iodine as the lost components were added to the recovered solvent of Example 1, the process was carried out. The result was the same as that of the above-mentioned process.

EXAMPLE 7

In accordance with the process of Example 1, the chlorination of the crude copper phthalocyanine was carried out. A test piece made of SUS 316L was dipped into the reaction mixture at 120° C. under the pressure of 5 kg./cm² gauge to test the corrosion. The degree of corrosion was 0.11 mm./year. On the other hand, in accordance with the process of Reference 4, the chlorination of copper phthalocyanine was carried out by using chlorosulfonic acid as the main solvent. A test piece made of SUS 316L was dipped into the reaction mixture at 120° C. under the pressure of 5 kg./cm² gauge to test the corrosion. The degree of corrosion was 2.8 mm./year.

We claim:

1. In a process for producing a highly chlorinated copper phthalocyanine by chlorinating a copper phthalocyanine in the presence of a catalyst for chlorination in a solvent by charging chlorine under an elevated pressure, characterized in that said chlorination is carried out in an inert organic solvent incorporating chlorosulfonic acid and/or pyrosulfuryl chloride at a ratio of 1 to 30 wt. % based on said inert organic solvent which maintain dispersibility of said resulting highly chlorinated copper phthalocyanine, wherein sulfur chloride and/or sulfur is incorporated at a ratio of more than 0.1 wt. % as sulfur based on said inert organic solvent and iodine and/or iodine chloride is incorporated at a ratio of more than 0.05 wt. % as iodine based on said inert organic solvent as catalyst for chlorination, and wherein the process for the chlorinating takes place in the range of 1 to 20 Kg/cm², gauge.

2. The process according to claim 1 wherein said inert organic solvent is inert but miscible to chlorosulfonic acid and pyrosulfuryl chloride and said mixture dissolves at least part of said copper phthalocyanine in said chlorinating condition and maintains dispersibility of said resulting highly chlorinated copper phthalocyanine.

3. The process according to claim 1 wherein said mixture is a mixture of chlorosulfonic acid and/or pyrosulfuryl chloride and said inert organic solvent selected from the group consisting of halogen substituted aliphatic saturated hydrocarbons halogen or nitro substituted aromatic hydrocarbons.

4. The process of claim 1, wherein said chlorination occurs at a temperature of about 120° C. to 150° C.

5. The process of claim 1, wherein pyrosulfuryl chloride is incorporated into the inert organic solvent.

6. The process of claim 1, wherein aliphatic organic solvents are employed.

* * * * *

UNITED STATES PATENT AND TRADEMARK OFFICE
CERTIFICATE OF CORRECTION

PATENT NO. : 4,330,470
DATED : May 18, 1982
INVENTOR(S) : Tomio Segawa et al

It is certified that error appears in the above—identified patent and that said Letters Patent is hereby corrected as shown below:

Please correct the Foreign Application Priority Data as follows:

[30] -- Foreign Application Priority Data

Jan. 31, 1980 [JP] Japan ......55/10474 --

Signed and Sealed this

Thirteenth Day of July 1982

[SEAL]

Attest:

GERALD J. MOSSINGHOFF

Attesting Officer

Commissioner of Patents and Trademarks